United States Patent
Jeong et al.

(10) Patent No.: US 8,187,400 B2
(45) Date of Patent: May 29, 2012

(54) MICROTUBULAR HONEYCOMB CARBON MATERIAL OBTAINED BY HEAT-TREATING CELLULOSE FIBER, PRODUCTION METHOD OF THEREOF, MICROTUBULAR REACTOR MODULE COMPRISING THE MICROTUBULAR HONEYCOMB CARBON MATERIAL AND METHOD FOR PRODUCING THE MICROTUBULAR REACTOR MODULE

(75) Inventors: Nam Jo Jeong, Daejeon (KR); Seong Ok Han, Daejeon (KR); Hong Soo Kim, Daejeon (KR); Hee Yeon Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 423 days.

(21) Appl. No.: 12/071,223

(22) Filed: Feb. 19, 2008

(65) Prior Publication Data

US 2009/0074633 A1   Mar. 19, 2009

(30) Foreign Application Priority Data

Sep. 18, 2007   (KR) ........................ 10-2007-0094579

(51) Int. Cl.
 C04B 33/34 (2006.01)
 B01J 19/00 (2006.01)
 B01J 10/00 (2006.01)
 B32B 3/12 (2006.01)
 B23K 11/00 (2006.01)
 B23K 26/00 (2006.01)
 C01B 31/00 (2006.01)
 B29C 65/00 (2006.01)

(52) U.S. Cl. ............... 156/89.22; 156/292; 422/129; 422/198; 428/116; 219/78.12; 219/121.85; 264/29.4

(58) Field of Classification Search ............ 422/198, 422/129; 156/292, 89.22; 219/121.85, 78.12; 428/116

See application file for complete search history.

(56) References Cited

U.S. PATENT DOCUMENTS 4,022,875 A * 5/1977 Vinton et al. ............. 423/445 R
(Continued)

FOREIGN PATENT DOCUMENTS

FR   1269274   8/1961
(Continued)

OTHER PUBLICATIONS

Demirbas, Ayhan, "Caronization ranking of selected biomass for charcoal, liquid and gaseous products" Energy Conversion and Management 42 (2001) 1229-1238.*
(Continued)

*Primary Examiner* — Philip Tucker
*Assistant Examiner* — Alex Efta
(74) *Attorney, Agent, or Firm* — LRK Patent Law Firm

(57) ABSTRACT

Disclosed herein are a microtubular honeycomb carbon material obtained by heat-treating cellulose fiber, a production method thereof, a microtubular reactor module fabricated using the microtubular honeycomb carbon, a method for producing the microtubular reactor module, and a microcatalytic reactor system comprising the microtubular reactor module. A carbon material having a new structure is produced by heat-treating cellulose fiber, and a catalytic reactor system having a new structure is constructed by coating the surface of the carbon material with a metal catalyst. Cellulose carbide, used as the reactor material, is very simple to produce. Because it has a micro honeycomb structure having a large number of microchannels and a large number of mesopores, it can be loaded with a large amount of a catalyst compared to the prior material having the same area, and thus it is useful as a catalyst support, and the reaction efficiency can be maximized. Also, the microcatalytic reactor system can be used in applications including very small steam reformer systems that use biomass fuel such as ethanol, fuel cell reactor systems, VOC and low-concentration-hydrogen treatment systems operable below 200☐, micro heat exchangers, and natural gas reformer systems. Thus, the invention is a useful, industrially applicable invention.

6 Claims, 11 Drawing Sheets

U.S. PATENT DOCUMENTS

| | | | | |
|---|---|---|---|---|
| 4,252,687 | A | * | 2/1981 | Dale et al. .................. 502/74 |
| 5,422,331 | A | * | 6/1995 | Galligan et al. ............ 502/333 |
| 5,855,781 | A | * | 1/1999 | Yorita et al. ............ 210/321.82 |
| 5,998,328 | A | * | 12/1999 | Dawes et al. ................. 502/182 |
| 6,352,756 | B1 | * | 3/2002 | Ichikawa et al. ............. 428/116 |
| 2003/0092569 | A1 | * | 5/2003 | Koike et al. .................. 502/325 |
| 2005/0145351 | A1 | * | 7/2005 | Schaible et al. ................. 162/9 |
| 2006/0172113 | A1 | * | 8/2006 | Kunieda ....................... 428/116 |
| 2008/0242535 | A1 | * | 10/2008 | Liu et al. ...................... 502/232 |

FOREIGN PATENT DOCUMENTS

| | | | |
|---|---|---|---|
| GB | 1016351 | | 1/1966 |
| JP | 07213865 | A * | 8/1995 |
| JP | 2004 188258 | | 7/2004 |
| JP | 2004188258 | A * | 7/2004 |
| JP | 2007-500663 | A | 1/2007 |

OTHER PUBLICATIONS

Phan, N.H. et al. "Production of fibrous activated carbons from natural cellulose (jute, coconut) fibers for water treatment applications," *Carbon* 44 (2006), pp. 2569-2577.

He, J. et al., "Fabrication of metal-nanoparticle/carbon-fiber composites having a microtube-array morphology," *Journal of Nanoparticle Research* 9 (2006), pp. 931-937.

Bae, J.-M. et al. "Microchannel development for autothermal reforming of hydrocarbon fuels," *Journal of Power Sources* 139 (2005), pp. 91-95.

European Search Report and annexes, dated Dec. 9, 2009, for Application No. EP 08 00 9730.

Japanese Office Action for Japanese Patent Application No. 2008-100162 which corresponds to U.S. Appl. No. 12/071,223.

* cited by examiner

[FIG. 1]
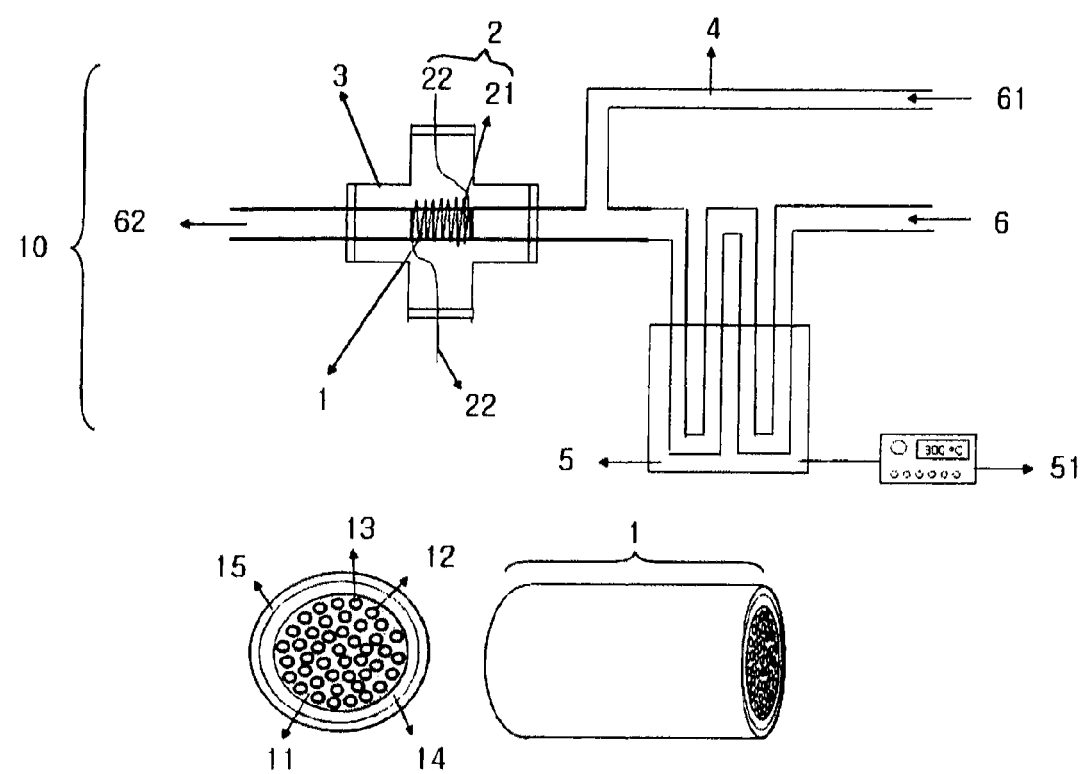

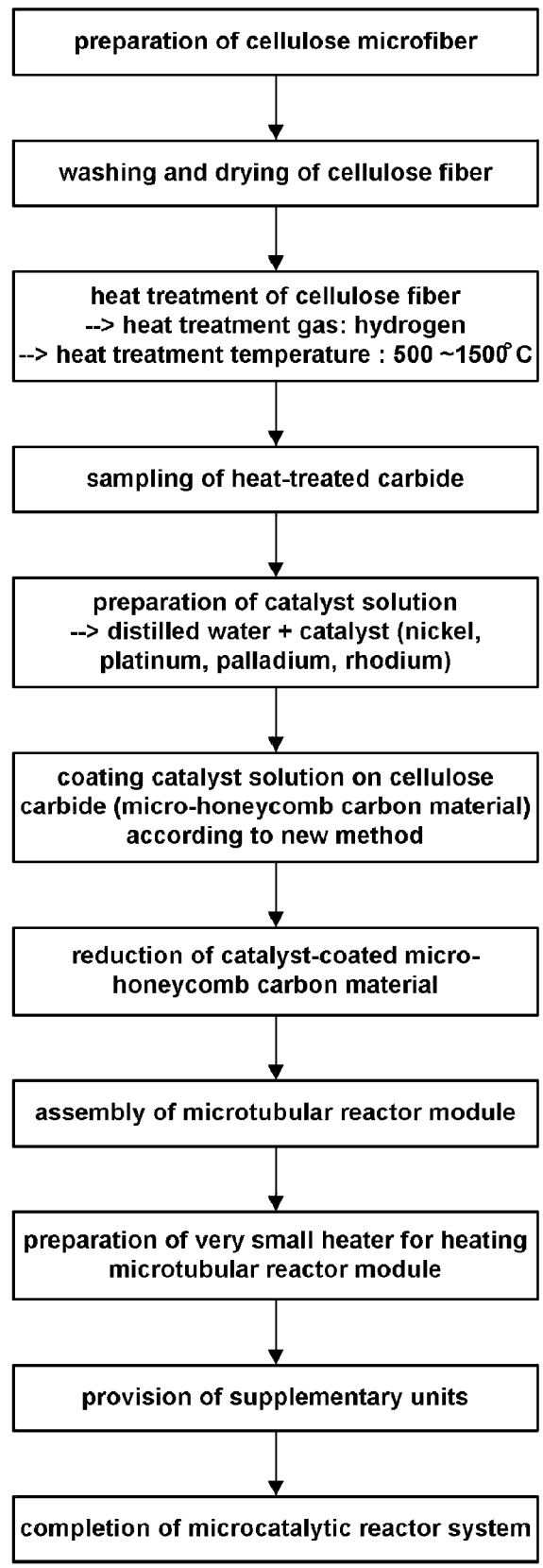
[FIG. 2]

[FIG. 3]
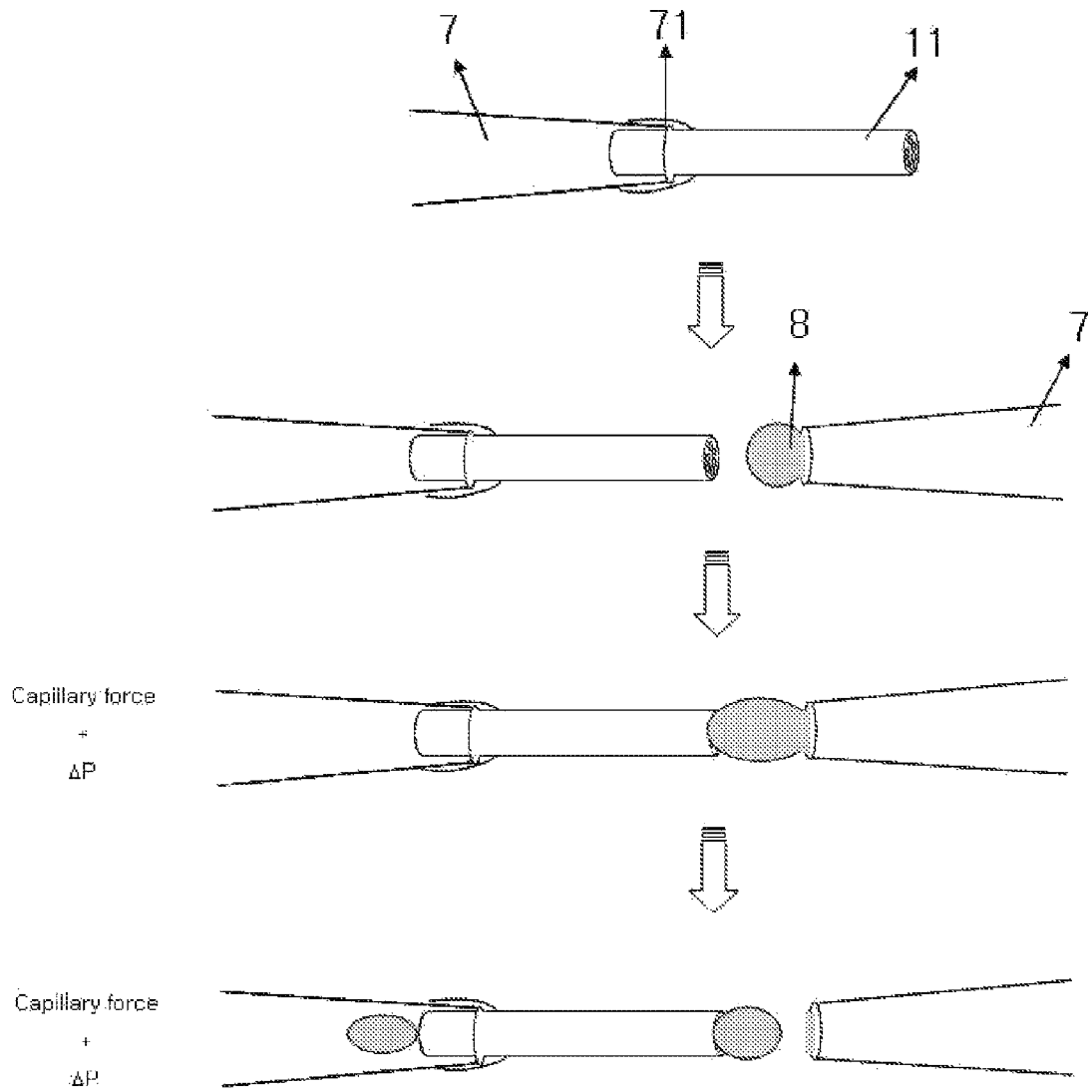

[FIG. 4]
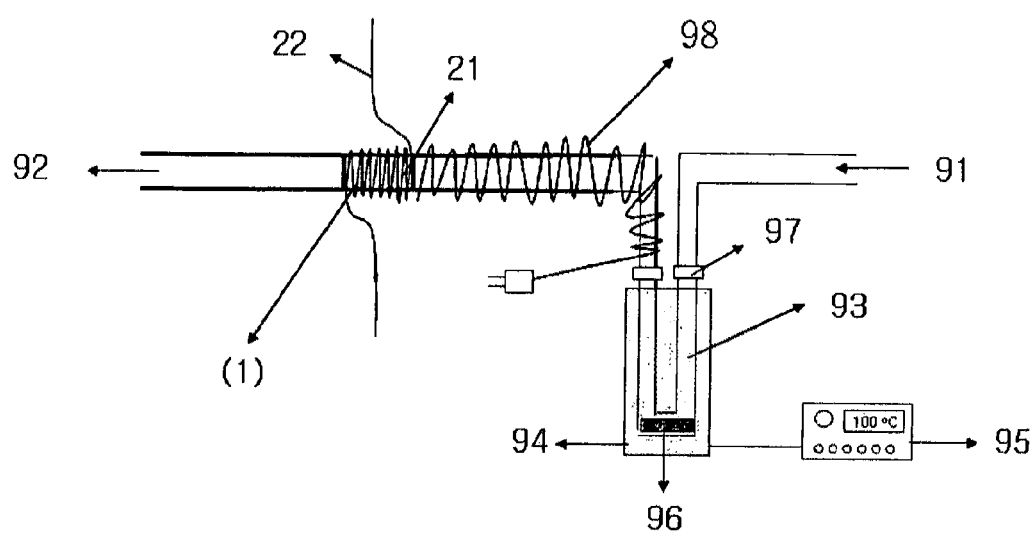

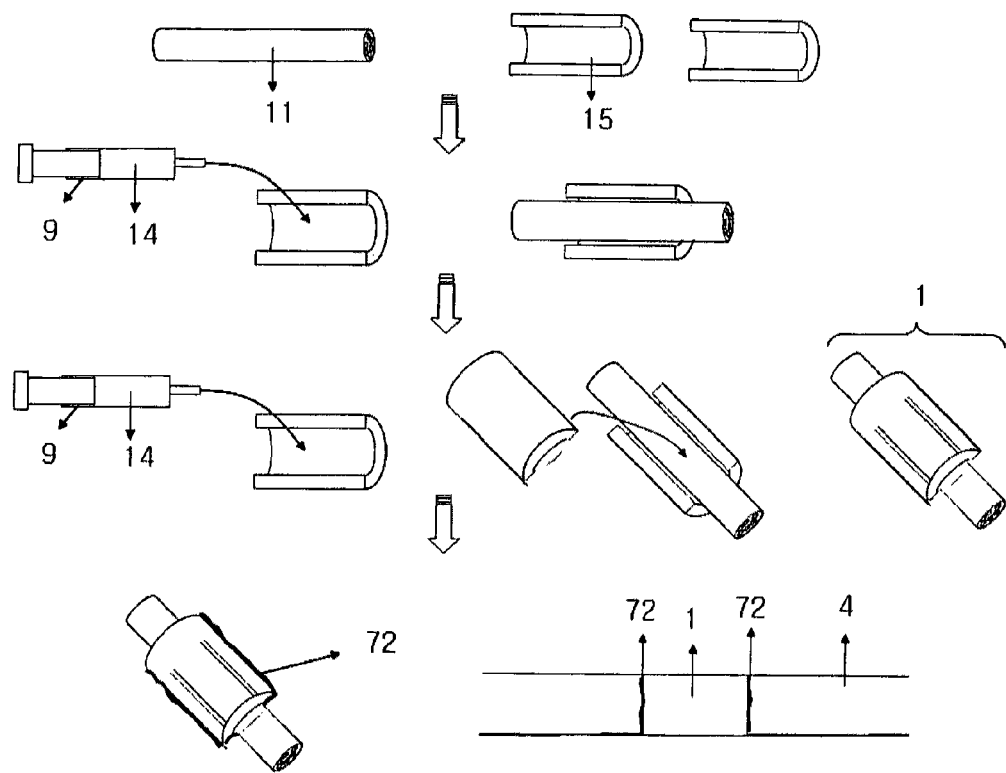
[FIG. 5]

[FIG. 6]
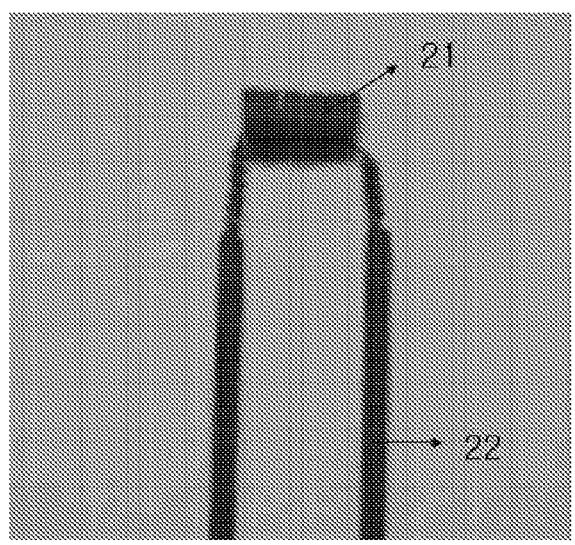
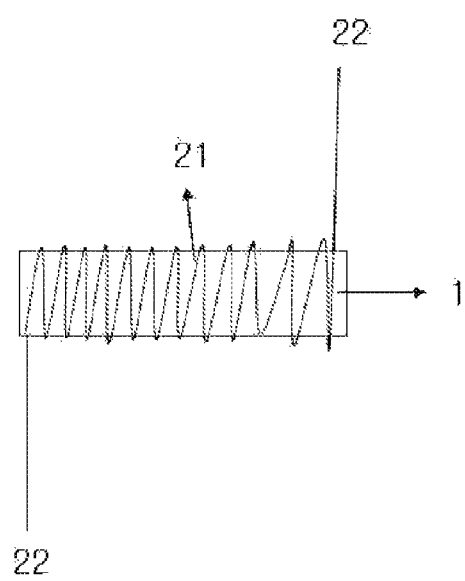

[FIG. 7]
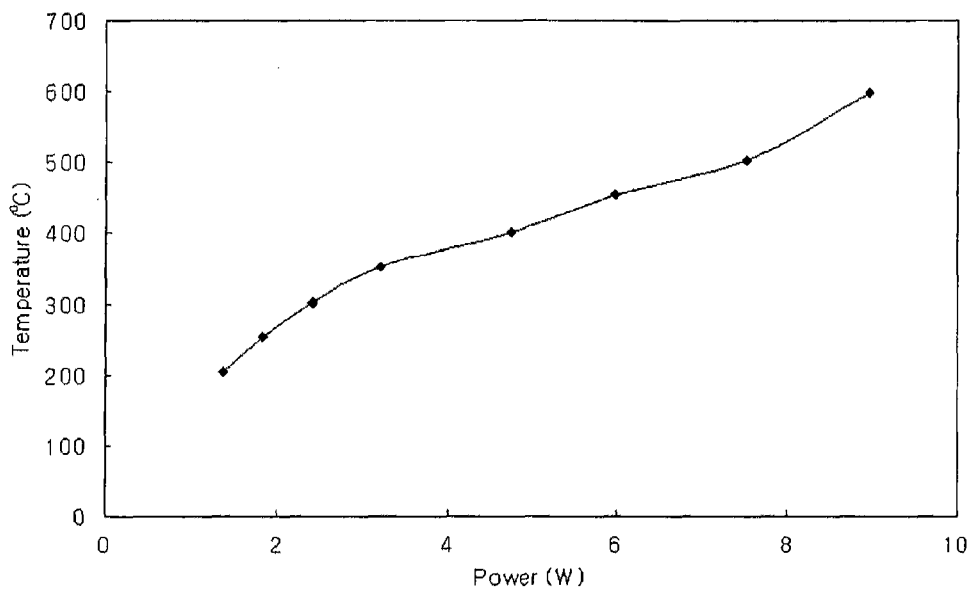

[FIG. 8]
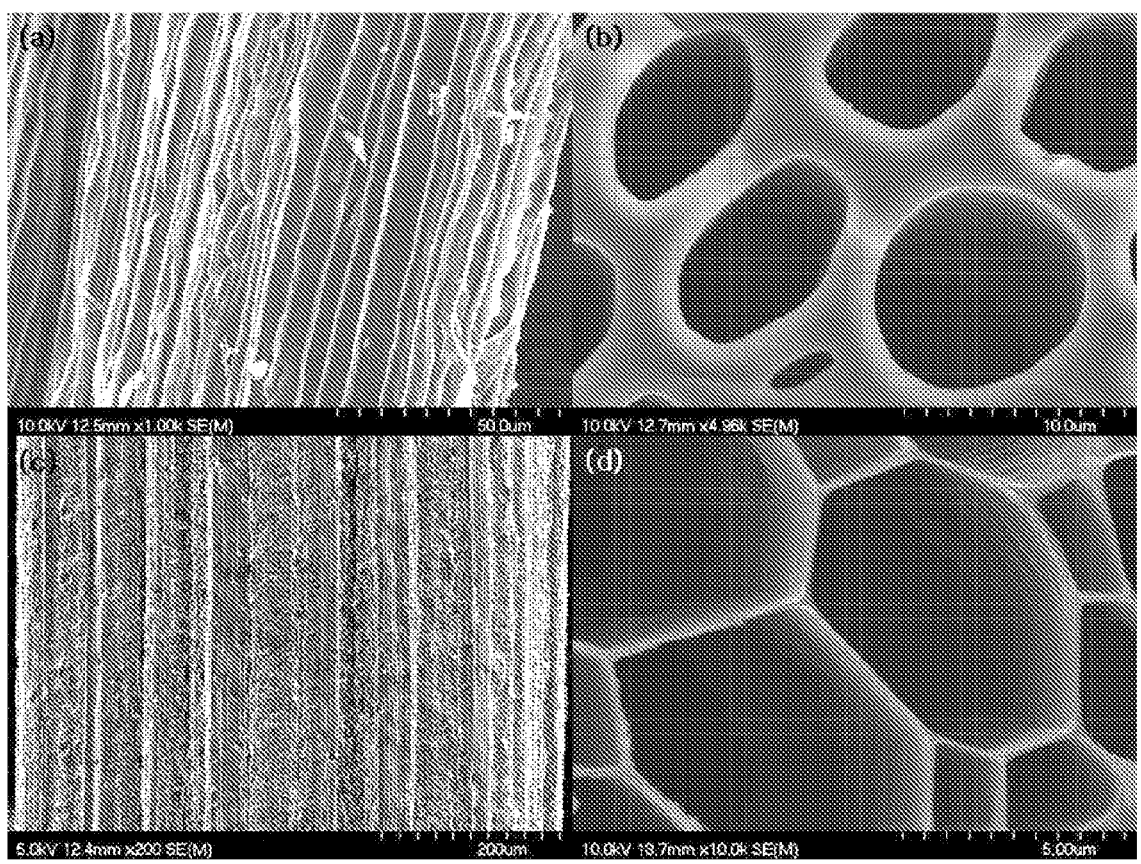

[FIG. 9]
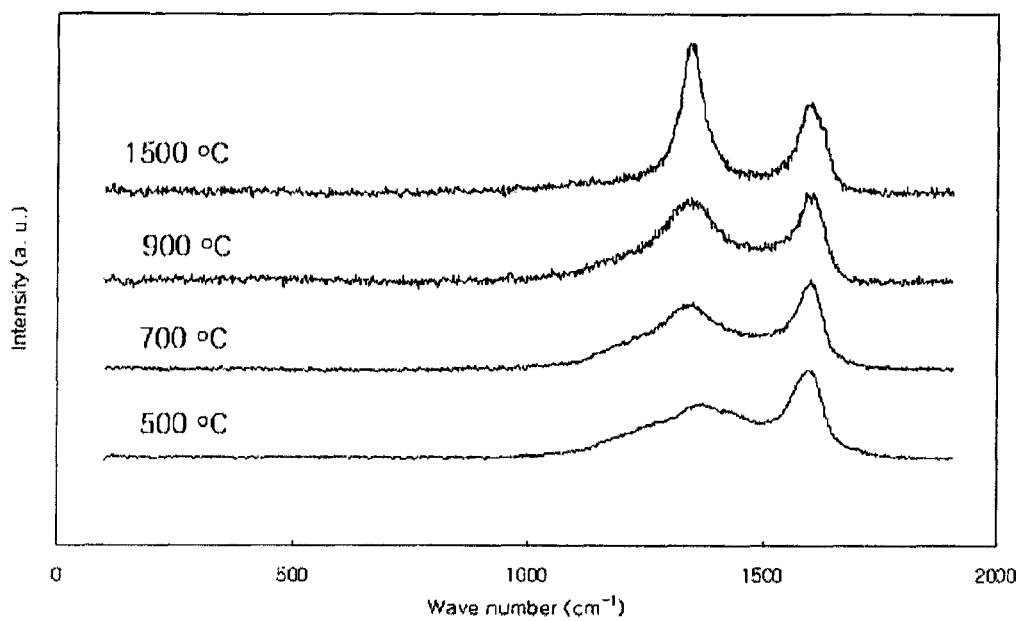

[FIG. 10]
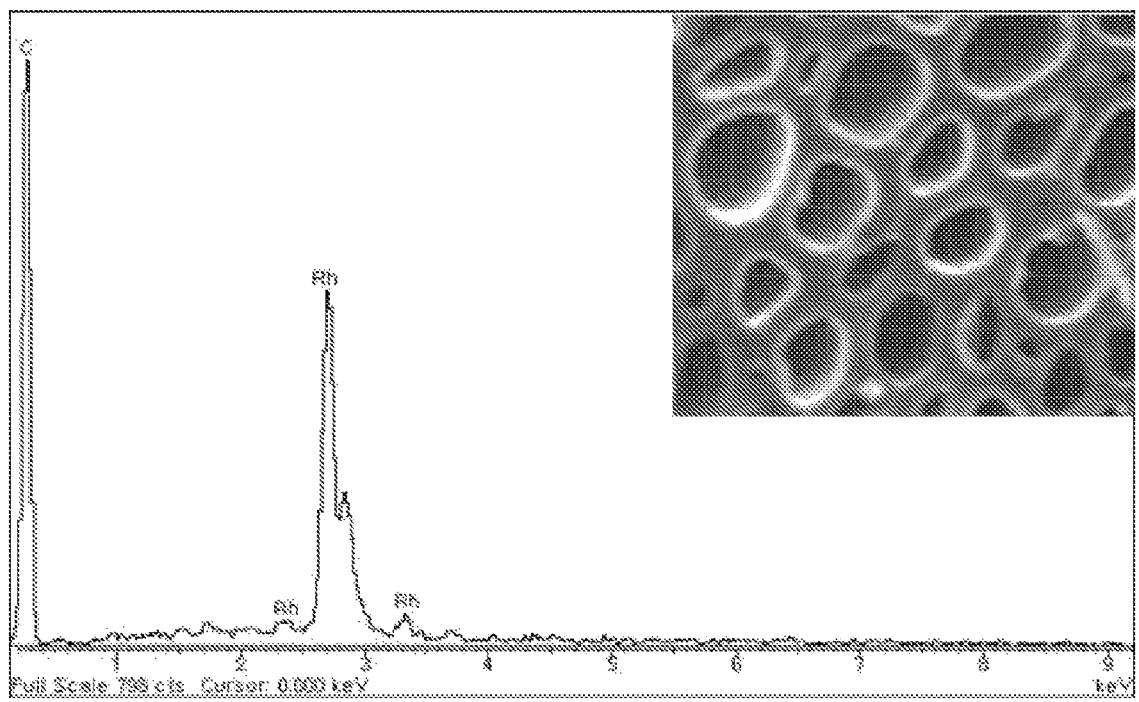

[FIG. 11]
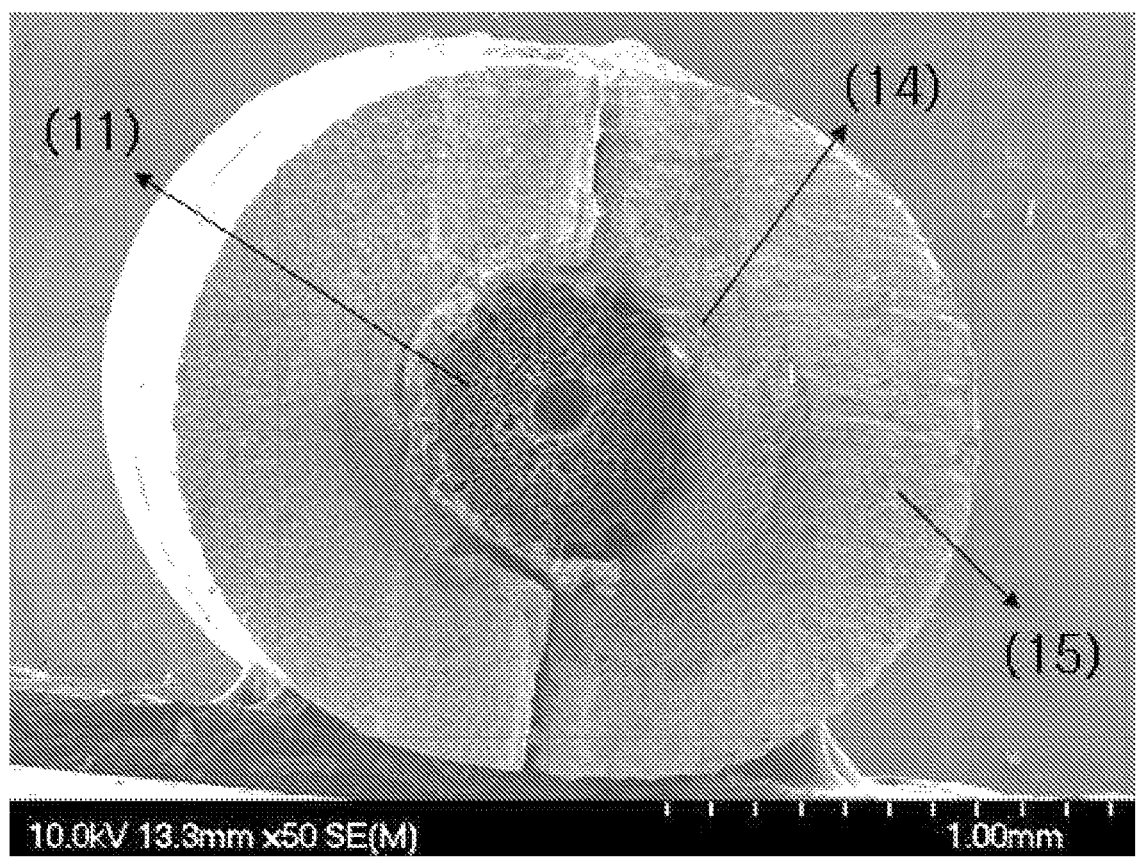

MICROTUBULAR HONEYCOMB CARBON MATERIAL OBTAINED BY HEAT-TREATING CELLULOSE FIBER, PRODUCTION METHOD OF THEREOF, MICROTUBULAR REACTOR MODULE COMPRISING THE MICROTUBULAR HONEYCOMB CARBON MATERIAL AND METHOD FOR PRODUCING THE MICROTUBULAR REACTOR MODULE

CLAIM OF PRIORITY

This application claims priority under 35 USC 119 to Korean Patent Application No. 10-2007-0094579, filed on Sep. 18, 2007, which is incorporated by reference in its entirety.

BACKGROUND OF THE INVENTION

1. Field of the Invention

The present invention relates to a microtubular honeycomb carbon material obtained by heat-treating cellulose fiber, a production method thereof, a microtubular reactor module comprising the microtubular honeycomb carbon material and a method for producing the microtubular reactor module, and more particularly to heat-treating cellulose fibers, which are forest resources, to form a carbide having a new structure, and using the carbide as a catalyst support to construct a microcatalytic reactor system having a microtubular structure.

2. Description of the Prior Art

Recently, studies on the use of forest resources have been actively conducted, and particularly, there have been attempts to use forest resources to develop advanced new materials combined with nanotechnology (NT), biotechnology (BT) and environmental technology (ET).

Among examples of use of forest resources, the most remarkable technological development and application field is composite material technology employing cellulose fibers, and the development of environmentally friendly, high-performance composite materials is actively being pursued in various countries.

Recently, studies focused on producing nano-scale cellulose fibers and using the same to synthesize composite materials having improved mechanical properties have been conducted in advanced countries. Technology employing forest resources is also applicable to hybrid energy materials, adsorbents, electrodes and battery materials, in addition to the above-described composite materials.

However, studies on the use of forest resources still remain at an early stage even in advanced countries, and in Korea, there has been little or no development of technology relating to this field.

Patent applications relating to the field of use of forest resources have not shown a clear increase in the number thereof. However, in the trend of recent studies in USA and European countries, the number of studies has increased slightly since the year 2005, and it is considered that the development of technology relating to the use of forest resources will rapidly increase starting in the year 2010, when the demand for nano/bio-technologies and energy/environmental technologies is expected to increase rapidly.

Recently, studies on the field of microcatalytic reactor systems have been steadily conducted. For example, there is an embodiment in which microchannels are formed in a metal thin film and are coated with a catalyst, and the resulting thin film is applied in reactor systems for fuel cells or in heat exchangers.

Such microcatalytic reactor systems have been used in various fields, including fuel cell technology, hydrogen reformer systems and micro heat exchanger technology, so that these reactor systems can be applied to the fields of electronic parts and small-sized energy systems, and the application fields and markets thereof are limitless.

However, in the prior technology, there are problems in that processes required for completion, including a channel forming process, a catalyst coating process, a calcining process and a process of joining a metal thin film, having the microchannel formed therein, to a reactor system, are very complicated, and in that there are limitations to channel size and catalyst coating amount, because each of the channels consists of a short channel, and therefore, it is not easy to achieve the miniaturization and improvement in efficiency of the reactor system.

Furthermore, there has not yet been any report of a catalyst support produced using forest resources such as cellulose fiber, as disclosed in the present invention, a microcatalytic reactor system comprising the catalyst support, and related application technologies.

SUMMARY OF THE INVENTION

The present invention has been made in order to solve the above-described problems, and it is an object of the present invention to provide a mesoporous, microtubular honeycomb carbon material, which has the unique structure of cellulose fiber carbonized at high temperature.

Another object of the present invention is to provide a method for producing a microtubular honeycomb carbon material, which has the unique structure of cellulose fiber carbonized at high temperature.

Still another object of the present invention is to provide a microtubular reactor module comprising a microtubular honeycomb carbon material, which has the unique structure of cellulose fiber carbonized at high temperature.

Yet another object of the present invention is to provide a method for producing a microtubular reactor module comprising a microtubular honeycomb carbon material, which has the unique structure of cellulose fiber carbonized at high temperature.

Yet still another object of the present invention is to provide a microcatalytic reactor system, which can be applied to very small systems and a microtubular reactor module comprising a microtubular honeycomb carbon material, which has the unique structure of cellulose fiber carbonized at high temperature.

To achieve the above objects, according to one aspect of the present invention, there is provided a method for producing a microtubular honeycomb carbon material for use in microcatalytic reactor systems, the method including: sufficiently wetting and washing cellulose microfiber with distilled water and drying the washed cellulose microfiber at room temperature; placing the dried cellulose microfiber in a reactor for high-temperature heat treatment and removing oxygen remaining in the reactor using a vacuum pump; and heat-treating the cellulose microfiber in the reactor in a hydrogen atmosphere while controlling the temperature of the reactor.

According to another aspect of the present invention, there is provided a microtubular honeycomb carbon material for use in microcatalytic reactor systems, which is produced according to said method and formed by carbonization of cellulose microfiber having a few tens of microtubules therein.

According to still another aspect of the present invention, there is provided a method for producing a microtubular reactor module for use in microcatalytic reactor systems, the method including: preparing a metal catalyst solution having a nano-sized metal catalyst dispersed therein; coating the metal catalyst solution on the inner surface of the microtubular honeycomb carbon material produced according to said method, the inner surface being in contact with fluid flow; drying the coated microtubular honeycomb carbon material and reducing the nano-sized metal catalyst-coated surface of the carbon material in a reducing atmosphere; and assembling and sealing a reactor frame around the reduced microtubular honeycomb carbon material using an adhesive.

According to still another aspect of the present invention, there is provided a method for producing a microtubular reactor module for use in microcatalytic reactor systems, the method including: assembling and sealing a reactor frame around the microtubular honeycomb carbon material, produced according to said method, using an adhesive; constructing a vapor phase deposition system and coating a catalyst from a catalyst precursor on the inner surface of the microtubular honeycomb carbon material in the vapor phase deposition system, the inner surface being in contact with fluid flow; and drying the coated microtubular honeycomb carbon material and reducing the nano-sized metal catalyst-coated surface of the carbon material in a reducing atmosphere.

According to still another aspect of the present invention, there is provided a microtubular reactor module for use in microcatalytic reactor systems, which is produced according to said method, including coating the inner surface of the microtubular honeycomb carbon material with the metal catalyst solution having the nanosized metal catalyst dispersed therein, the inner surface being in contact with fluid flow.

According to still another aspect of the present invention, there is provided a microtubular reactor module for use in microcatalytic reactor systems, which is produced according to said method, including coating the inner surface of the microtubular honeycomb carbon material with the catalyst from the catalyst precursor in the vapor phase deposition system.

According to yet another aspect of the present invention, there is provided a microcatalytic reactor system comprising a microtubular reactor module produced using a microtubular honeycomb carbon material obtained by heat-treating cellulose fiber, the microcatalytic reactor system comprising: a microtubular reactor module, which is produced by assembling and sealing a reactor frame around a microtubular honeycomb carbon material, obtained by heat-treating cellulose microfiber, using an adhesive, and serves to allow supplied reaction fuel to catalytically react; a very small heater wound such that it can locally heat only the microtubular reactor module; a transport pipe line connected to the microtubular reactor module such that it supplies reaction fuel and purge gas to the microtubular reactor module; an evaporation heater disposed in a region that is part of the transport pipe line such that it vaporizes the reaction fuel supplied to the microtubular reactor module when the reaction fuel is in a liquid state; a control unit for controlling the temperature of the evaporation heater; and a quartz reactor for fixing the entire reaction portion of the microtubular reactor module.

The present invention relates to the application field of cellulose materials which have recently been studied and used in various fields. The present invention has advantages in that a microtubular channel structure having a mesoporous surface can be formed in a very simple manner from cellulose fiber, which is a biomaterial from which carbides having various structures can be obtained, and in that the microtubular channel structure can be used as a catalyst support to construct not only a large-sized catalytic combustion system, but also a micro reactor system, which is applicable in the field of small-sized energy systems.

Particularly, microcatalytic reactor systems have recently been used in various fields, including fuel cell technology, hydrogen reformer systems and micro heat exchanger technology, in order to apply these reactor systems in electronic parts and small-sized energy systems, and the application field and market thereof are infinite.

However, in the prior technology, there are problems in that processes required for completion, including a channel forming process, a catalyst coating process, a calcining process and a process of joining a metal thin film, having the microchannel formed therein, to a reactor system, are very complicated, and in that there are limitations in channel size and catalyst coating amount, because each of the channels consists of a short channel, and therefore, it is not easy to achieve the miniaturization and improvement in efficiency of the reactor system.

In comparison with this, the reactor system according to the present invention has advantages in that cellulose carbide, which is used as a reactor material, is very simple to produce, and in that, because it has a micro honeycomb structure having a large number of microtubular channels therein and mesopores in the surface thereof, it can be loaded with a large amount of a catalyst compared to the prior material having the same area, thus maximizing reaction efficiency.

Accordingly, the microcatalytic reactor system of the present invention is meaningful in that it is fabricated using novel cellulose carbide, which has a micro-honeycomb structure. In addition, the microcatalytic reactor system can be used in applications including very small steam reformer systems, which use biomass fuel such as ethanol, fuel cell reactor systems, VOC and low-concentration-hydrogen treatment systems operable below 200° C., micro heat exchangers, and natural gas reformer systems. Thus, the present invention is a useful, industrially applicable invention.

BRIEF DESCRIPTION OF THE DRAWINGS

The above and other objects, features and advantages of the present invention will be more clearly understood from the following detailed description taken in conjunction with the accompanying drawings, in which:

FIG. 1 shows an overall schematic view of a microcatalytic reactor system according to the present invention and a detail view of a microtubular reactor module according to the present invention;

FIG. 2 is a flowchart showing the production of a microtubular honeycomb carbon material from cellulose according to the present invention and the use of the microtubular honeycomb carbon material to fabricate a microcatalytic reactor system;

FIG. 3 is a detail view showing a method of coating a catalyst solution on the surface of the microtubular honeycomb carbon material according to the present invention using capillary force and pressure gradient;

FIG. 4 is a detail view of a method of coating a catalyst on the surface of the microtubular honeycomb carbon material according to the present invention using a vapor deposition method;

FIG. 5 is a detail view of a method of constructing a micromodular reactor module using the catalyst-coated microtubular honeycomb carbon material according to the present invention;

FIG. 6 shows an actual photograph of a very small heater for heating a micro reactor system according to the present invention, and shows a schematic diagram of a method for applying the very small heater;

FIG. 7 shows measurement results obtained in an example conducted using a very small heater for heating a microcatalytic reactor system according to the present invention;

FIG. 8 shows SEM images of henequen and *Setaria viridis*, heat-treated at high temperature in a hydrogen atmosphere according to the present invention;

FIG. 9 shows the results of Raman spectroscopy of carbides having a new structure, obtained by heat-treating henequen cellulose fiber at varying temperatures in a hydrogen atmosphere according to the present invention;

FIG. 10 shows the results of energy dispersive X-ray (EDX) analysis of the inventive microtubular honeycomb carbon material coated with a rhodium catalyst; and FIG. 11 is a general view of a microtubular reactor module fabricated using a microtubular honeycomb carbon material according to the present invention.

DETAILED DESCRIPTION OF THE INVENTION

Hereinafter, the present invention will be described in detail.

The present invention encompasses technology for producing a carbide having a new structure, which can be widely used as a new catalyst support, from cellulose fiber as forest resources. This technology can be used in microcatalytic reactor systems, which can be used in various specific applications, including a microcatalytic reactor system for producing hydrogen using biomass, a microcatalytic reactor system for micro heat exchangers, a microcatalytic reactor system for fuel cell systems, and a microcatalytic reactor system for VOC treatment and sensitization.

Recently, studies on microcatalytic reactor systems in the related application fields have been steadily conducted. For example, there is an example in which a microchannel is formed in a metal thin film and coated with a catalyst, and the resulting thin film is applied to reactor systems for fuel cells or to heat exchangers. However, the microcatalytic reactor system fabricated using cellulose fiber, attempted in the present invention, is a technology attempted for the first time in the world, and the method for constructing the system and a catalyst coating method are particularly innovative. Also, the microcatalytic reactor system of the present invention is characterized in that the amount of catalyst loaded therein can be greatly increased compared to a prior microcatalytic reactor system having the same size, thus greatly increasing reaction efficiency.

According to the present invention, heat treatment is carried out at high temperature in an oxygen-free atmosphere, and hydrogen is used as atmospheric gas to reduce the amount of oxides remaining in the cellulose fiber. The temperature for the carbonization of cellulose is controlled to a maximum of 1500° C. so as to eliminate damage to carbides in a catalytic reaction suitable for each of application fields.

Also, in order to uniformly coat a metal catalyst such as nickel, or a noble metal catalyst, such as rhodium, palladium or platinum, on a micro-honeycomb structure having many microtubules present therein, the present invention suggests the appropriate use of the capillary force of microtubules and the pressure gradient between the upper and lower ends of the micro-honeycomb structure in combination with each other. As another catalyst coating method, a vapor deposition method is suggested in the present invention. In addition, the present invention suggests a new process which comprises mounting a micro-honeycomb in a reactor, the micro-honeycomb including a few tens of 5-10-μm-width microchannels therein and having a diameter of 200-600 μm, and fixing and sealing the mounted micro-honeycomb.

Hereinafter, the construction and operation of embodiments of the present invention will be described in detail with reference to the accompanying drawings.

FIG. 1 shows an overall schematic view of a microcatalytic reactor system 10 according to the present invention and a detail view of a microtubular reactor module 1 according to the present invention. As shown in FIG. 1, the microcatalytic reactor system 10 comprises: a microtubular reactor module 1, which is manufactured by assembling and sealing a reactor frame 15 around a microtubular honeycomb carbon material 11, obtained by heat-treating cellulose microfiber, using an adhesive 14, and which allows reaction fuel supplied therein to react catalytically; a very small heater 2 wound around the microtubular reactor module such that it can locally heat only the microtubular reactor module; a transport pipe line 4 connected to the microtubular reactor module such that it supplies reaction fuel 6 and purge gas 61 to the microtubular reactor module; an evaporation heater 5 disposed in region occupying part of the transport pipe line such that it vaporizes the reaction fuel 6 supplied to the microtubular reactor module 1 when the reaction fuel 6 is in a liquid state; a control unit 51 for controlling the temperature of the evaporation heater 5; and a quartz reactor 3 for fixing the entire reaction portion of the microtubular reactor module.

The reaction fuel 6 may consist either of a mixture of gas, such as VOC gas, hydrogen or natural gas, with air, or liquid fuel such as ethanol or methanol. If gas fuel such as VOC gas or hydrogen is supplied, it must be mixed with air in order to react. In this case, the microtubular honeycomb carbon material 11 can be applied in low-temperature VOC treatment systems or low-temperature hydrogen reaction systems, which can be used at temperatures lower than 300° C., because, when a combustion reaction occurs above 300° C., the microtubular honeycomb carbon material 11, as a catalyst support, can be oxidized, making it difficult to maintain the original structure thereof. However, in a reaction for reforming gas fuel such as natural gas, the microtubular honeycomb carbon material 11 can be used even in a high-temperature reaction at temperatures lower than 1000° C.

Also, if it is used in a reaction for reforming liquid fuel such as ethanol or methanol, means for vaporizing it and supplying the vaporized fuel to the reactor system are required. As shown in FIG. 1, the evaporation heater 5 and the unit 51 for controlling the heater 5 are provided for this purpose. Fields in which biomass fuel such as ethanol or methanol can be used include biomass steam reformer system and fuel cell fields.

Accordingly, the microtubular honeycomb carbon material 11 in the present invention is produced by heat-treating cellulose fiber in a hydrogen atmosphere at a maximum of 1500° C., and preferably 500-900° C., and can be used over a wide temperature range. However, it can be mainly used in most low-temperature reactor systems which can be used at temperatures lower than the oxidation temperature of carbon, because, when a reaction is carried out in an oxidizing atmosphere, the carbon of the microtubular honeycomb carbon material can be oxidized or structurally damaged.

The microtubular reactor module 1 comprises: the microtubular honeycomb carbon material 11; the reactor frame 15 for fixing the reactor module and connecting the reactor module to the gas transport pipe; and the adhesive 14 for filling and sealing the gap between the above two elements.

The microtubular honeycomb carbon material 11 comprises a few tens of microtubular channels 12 in which the diameter of each of the microtubules is 5-10 μm and the surfaces of the microtubules are coated with various kinds of metal and noble metal catalysts.

The reactor frame 15 is mainly made of a metal material, and preferably an SUS metal. The size of the reactor frame 15 can vary slightly depending on the size of the microtubular honeycomb carbon material 11. Generally, if the outer diameter of the microtubular honeycomb carbon material 11 is 200-600 μm, a circular tube having an inner diameter of 500-900 μm is used as the reactor frame. Moreover, the reactor frame 15 may also be made of a ceramic material.

Examples of the adhesive 14 that is used for the sealing of the microtubular reactor module 1 include optical adhesives for use at temperatures lower than 300° C., epoxy-based adhesives, and ceramic adhesives for use at temperatures higher than 300° C.

The aspect ratio of the microtubular reactor module 1, fabricated as described above, may be a maximum of 100, because it is possible to produce microtubular honeycomb carbon material having a large aspect ration.

In FIG. 1, reference numeral 22 indicates a lead wire, and reference numeral 62 indicates reaction gas.

FIG. 2 is a flowchart showing a process of producing the microtubular honeycomb carbon material 11 from cellulose according to the present invention and using the microtubular honeycomb carbon material to fabricate a microcatalytic reactor system. In FIG. 2, a method for producing the microtubular honeycomb carbon material and a step of fabricating the final microcatalytic reactor system are shown.

The step described in the first half of FIG. 2 is a step of producing the microtubular honeycomb carbon material from cellulose fiber, which is a forest resource. As shown in FIG. 2, the microtubular honeycomb carbon material is produced by washing and drying cellulose fiber, placing the dried cellulose fiber in a reactor, and then heat-treating the cellulose fiber in a hydrogen atmosphere while maintaining the temperature of the reactor at a maximum of 1500° C., and preferably 500-900° C.

The method of producing the microtubular reactor module using the microtubular honeycomb carbon material thus produced, having a new structure, comprises uniformly coating various kinds of metal and noble metal catalysts on the surface of the microtubular honeycomb carbon material at a micro-scale level using the capillary force of microtubules and the pressure difference between the upper and lower ends of the microtubular honeycomb structure, reducing and calcining the coated catalyst, and using the resulting material to assemble the microtubular reactor module.

Also, the method for producing a catalytic reactor system using the microtubular reactor module thus produced comprises providing a very small heater capable of locally heating only the microtubular reactor module, a unit for supplying reaction fuel, a purge gas supply unit, a heater for vaporizing liquid fuel, and other supplementary units.

Specifically, the method comprising all the above-described steps includes the steps of:

Sufficiently wetting and washing cellulose fiber with distilled water and drying the washed cellulose fiber;

placing the dried cellulose fiber in a high-temperature reactor and removing oxygen remaining in the reactor using a vacuum pump; heat-treating the cellulose fiber in the reactor in a hydrogen atmosphere while maintaining the temperature of the reactor at a maximum of 1500° C., and preferably within a range of 500-900° C.;

sampling the heat-treated material;

dispersing in distilled water any one selected from the group consisting of metal catalysts, such as nickel, and noble metal catalysts, such as platinum, palladium and rhodium, to realize a catalyst concentration of 0.01-1 mol;

placing the catalyst dispersion in a first micro-pipette, locating the micro-pipette at one side, placing the above-produced microtubular honeycomb carbon material in a second micro-pipette, sealing the gap between the second micro-pipette and the microtubular honeycomb carbon material with an optical adhesive, locating the second micro-pipette at the other side, forming a pressure gradient between both ends of the microtubular honeycomb carbon material using the capillary force of the microtubular honeycomb carbon material and a vacuum pump so as to draw the drop of catalyst solution formed in the first micro-pipette and to coat the catalyst on the surface of the microtubules fixed in the second micro-pipette, and repeating this pressure gradient-forming process to coat the catalyst on the surface of the microtubules;

drying the resulting microtubular honeycomb carbon material 11 and then reducing the catalyst-coated surface of the microtubular honeycomb carbon material 11 in a reducing atmosphere;

placing the reduced microtubular honeycomb carbon material in a half reactor frame filled with a ceramic adhesive, covering the resulting microtubular honeycomb carbon material with another half reactor frame filled with a ceramic adhesive, and drying the resulting microtubular reactor module;

sealing all the gaps in the dried microtubular reactor module by laser welding, if the reactor frame 15 is made of a SUS metal, or sealing all the gaps with a high-temperature ceramic adhesive, if the reactor frame is made of a ceramic material; and connecting the sealed microtubular reactor module to each of gas and fuel transport pipes, and providing a very small heater for heating the microtubular reactor module, various supply units, and other supplementary units such as an evaporation heater for liquid fuel, thus providing the final microcatalytic reactor system.

As a supplementary description, in order to produce the microtubular honeycomb carbon material, cellulose microfiber is first prepared. Although various cellulose microfibers may be used in the present invention, those having many sieve plates in sieve tubes can cause high pressure gradient in fluid flow, and in some cases, can interfere with fluid flow itself. For this reason, it is advantageous to use plants having many vessels (microtubules).

In an embodiment of the present invention, henequen or *Setaria viridis* was used for the cellulose microfiber.

FIG. 3 is a detail view showing a method of coating a catalyst solution on the surface of the microtubular honeycomb carbon material using capillary force and a pressure gradient according to the present invention, and FIG. 4 is a detail view showing a method of coating a catalyst on the surface of the microtubular honeycomb carbon material using a vapor phase deposition method according to the present invention. As shown in FIG. 3, once a nano-sized catalyst solution 8 is prepared, it may be coated on the surface of the microtubular honeycomb carbon material. In addition to the method using the catalyst solution 8, a method for vapor-depositing a catalyst precursor, as shown in FIG. 4, may be used as the catalyst coating method.

The first method shown in FIG. 3 is a method of forming the catalyst solution 8 on the surface of the microtubules using the capillary force of the microtubular structure and the pressure gradient formed at both ends of the microtubular structure. This coating method is carried out according to the procedure shown in FIG. 3. First, one end of the microtubular honeycomb carbon material 11, obtained by heat-treating cellulose fiber as shown in FIG. 2, is placed in a micro-pipette 7. The micro-pipette 7 generally has a size of about 1000 μm, and an optical adhesive 71 is used to seal the gap between the pipette 7 and the microtubular honeycomb carbon material 11. After the optical adhesive 71 is applied to the gap 71, UV irradiation curing is conducted. Then, the prepared catalyst solution 8 is placed in another micro-pipette 7, which is then pressurized with a syringe to form a drop at the end of the pipette 7. At this time, the end of the micro-pipette 7 having the microtubular honeycomb carbon material 11 placed therein is located close to the second pipette 7, in which the drop of the catalyst solution 8 is formed. Then, when a vacuum pump is connected to the micro-pipette 7 having the microtubular honeycomb carbon material 11 placed therein, so as to form a pressure gradient, the catalyst solution 8 is naturally introduced into the microtubular honeycomb carbon material 11 due to the capillary force of the microtubules and the pressure difference between the upper and lower ends of the microtubules, and during this process, the catalyst is coated on the surface of the microtubular honeycomb carbon material 11. Herein, the applied pressure is less than 1 mbar. The reason why the pressure is limited is because coating properties can vary depending pressure, and the microtubular structure can break at excessively high pressure. After the coating process, the resulting structure is dried at room temperature, and this process is repeated to coat the catalyst on the surface of the microtubular honeycomb carbon material 11.

The second method is a method of vapor-depositing particles of a nano-sized catalyst 93 on the surface of the microtubular honeycomb carbon material 11 using a catalyst precursor 96. This method is carried out as shown in FIG. 4.

This method can be carried out in the order of fabricating the microtubular reactor module 1, and then using it to vapor-deposit the catalyst, in contrast to the order shown in FIG. 5, coating the catalyst, and then fabricating the microtubular reactor system.

That is, the microtubular honeycomb carbon material 11 not coated with the catalyst is used, and the microtubular reactor module 1 thus fabricated is used to fabricate the system as shown in FIG. 4.

The coating system shown in FIG. 4 comprises gas 91 for transporting the vaporized precursor, a precursor vaporizing reactor 93 serving as a precursor container, and a heater 94 for vaporizing the precursor, the microtubular reactor module 1, a very small heater 2, and a line heater 98.

As the gas 91 for transporting vaporized gas, nitrogen gas is used. Also, the precursor vaporizing reactor 93 is made of a quartz material, and the temperature thereof is controlled by a control unit 95. The temperature is controlled in the range of about 50-100° C., even though it varies depending on the kind of precursor.

The precursor vaporizing reactor 93 and the gas transport line are connected and sealed with a union coupler 97.

The line heater 98 serves to maintain the vaporized catalyst precursor 96 at the same temperature as the vaporization temperature of the precursor such that the vaporized catalyst precursor 96 is not deposited on the line before it arrives at the microtubular reactor module 1. The temperature of the microtubular reactor module 1 is controlled by the very small heater 2, and electric power is controlled such that the temperature can be maintained within the range of 70-150° C.

FIG. 5 is a detail view showing a method of fabricating the microtubular reactor module 1 using the catalyst-coated honeycomb carbon material 11 according to the present invention. Hereinafter, the method will be described.

First, the catalyst-coated microtubular honeycomb material 11 and the reactor frame 15 are provided.

The reactor frame 15 is provided in halves, and the reason therefor is because, if the reactor frame 15 is circular in shape, the adhesive that is used to seal the gap between the microtubular honeycomb carbon material 11 and the reactor frame 15 on the micro-scale is difficult to introduce into the reactor frame 15 due to surface tension. For this reason, the reactor frame 15 is provided in halves such that the adhesive for sealing can be uniformly applied the entire surface of the microtubular honeycomb carbon material 11 and the reactor frame 15.

The adhesive 14 is uniformly applied on the prepared reactor frame 15 using a syringe containing the adhesive. Then, the prepared microtubular honeycomb carbon material 11 is placed in the reactor frame half 15, to which the adhesive is applied, before it is completely cured. Meanwhile, the adhesive 14 is uniformly applied to another reactor frame half 15, and then the second reactor frame half is combined with the first reactor frame half having the microtubular honeycomb carbon material 11 adhered thereto, and is then subjected to a curing process, thus completing a precursor of the microtubular reactor module 1.

The curing process after the application of the adhesive is carried out by drying the adhesive at a temperature of 100-150° C. (drying at this temperature resulted in the best adhesion) for more than 24 hours (if the curing time is shorter than 12 hours, the drying state of the adhesive is not complete, and for this reason, the adhesive is dried for more than 24 hours for sufficient drying in order to ensure a good adhesion state). The gaps in the draft of the microtubular reactor module are completely sealed such that gas does not leak out.

If the reactor frame is made of an SUS material, it is sealed by laser welding 72. Then, the fabrication of the microtubular reactor module 1 is completed, and the completed microtubular reactor module 1 is connected to a gas transport pipe line 4 and sealed by laser welding 72. If the reactor frame 15 is made of a ceramic material, all the gaps therein are sealed with a ceramic adhesive for use at high temperature to complete the microtubular reactor module 1, which is then connected to the gas transport pipe line.

After the catalyst coating and the fabrication of the microtubular reactor module 1 are completed as described above, the very small heater 2 for catalytic reaction is placed around the microtubular reactor module 1. FIG. 6 shows an actual photograph of the very small heater 2 for heating the microcatalytic reactor system 10 according to the present invention, and shows a method for implementing the very small heater. As shown in FIG. 6, the very small heater 2 consists of a lead wire 22, both ends of which are connected with a heating portion which is in contact with the microtubular reactor module 1, and the heating portion 21 of the very small heater 2 is made of platinum, nickel+chromium alloy, or kanthal. On the heating portion, a thin oxide film is formed such that no short circuit occurs even if mutual contact occurs during heating. As shown in FIG. 6, the very small heater 2 is fabricated such that it wounds around the microtubular reactor module 1. Also, it has a length of about 1-10 mm, although this can vary slightly depending on the aspect ratio of the microtubular reactor module 1.

When the very small heater 2 for catalytic reaction is mounted on the microtubular reactor module 1 as described above, and supplementary units, such as a pipe line for reaction fuel 6, an evaporation heater 6, and the like, are connected to the microtubular reactor module 1, the fabrication of the microcatalytic reactor system 10 is completed.

Hereinafter, preferred embodiments of the present invention will be described in detail.

Example 1

FIG. 7 shows measurement results obtained in an example using the very small heater 2 for heating the microcatalytic reactor system. The heating portion 21 of the very small heater 2 had a length of 1.5 mm and a length of 2 mm and was made of an alloy of nickel and chromium. The heating portion was connected with the lead wire 22 for supplying power, and an oxide film was formed thereon such that no short circuit would occur even upon mutual contact.

The measurement results in FIG. 7 shows the temperature within the microtubular reactor module 1 as a function of power supplied to the very small heater 2. In order to measure the temperature within the microtubular reactor module 1, a SUS tube having the same size as that of the microtubular reactor module 1 was placed in the heater, and a k-type thermocouple was placed in the center thereof to measure the temperature. In the measurement results, it was found that the temperature within the microtubular reactor module 1 could be heated to 300° C. within a few seconds with a power of 2.5 W, suggesting that the very small heater is a system suitable for heating the microcatalytic reactor system 10.

Example 2

FIG. 8 shows SEM images of the cross section and body of the microtubular honeycomb carbon material 11, produced by heat-heating henequen and *Setaria viridis* at high temperature in a hydrogen atmosphere according to the present invention.

The experiment was performed at 900° C. in a 100% hydrogen gas atmosphere. The heating rate was 35° C./min, and the sample was maintained at 900° C. for 30 min. Hydrogen was cooled starting from the time point at which the temperature was elevated, and was supplied until the experiment was terminated.

In the experimental results, as shown in FIG. 8(*a*), it could be observed that the original henequen sample was carbonized without great damage to the shape thereof.

FIG. 8(*b*) shows the cross section of the heat-treated sample. It was observed that the heated-treated sample was very clearly treated compared to the original sample and had a microtubular structure having a diameter of about 5-20 μm.

FIG. 8(*c*) shows the shape of *Setaria viridis* after heat treatment. As can be seen in FIG. 8(*c*), no structural damage was observed, but there were very fine pores in the surface. FIG. 8(*d*) shows observation results for the cross section thereof. It was observed that the size thereof was not greatly different from that of henequen, but the thickness of membranes between the microtubules was thinner that that of henequen. Also, it consisted mostly of carbon.

Example 3

FIG. 9 shows the results of Raman spectroscopy of a carbide 11 having a new structure, obtained by heat-treating henequen cellulose fiber to varying temperatures in a hydrogen atmosphere according to the present invention. The peaks in FIG. 9 showed the strongest intensity at around 1350 cm$^{-1}$ and 1580 cm$^{-1}$. The results at these locations indicate a D-line (disordered line) and a G-line (graphite line), respectively, which are generally found in materials consisting of carbon. It can be seen that the tendency of the peaks varied slightly depending on the temperature. At 500° C., a tendency similar to amorphous carbon, which can be frequently seen in charcoal, was observed; however, as the temperature was increased, the peaks showed a tendency to change to values for a carbon material, observed in graphitized carbon, even though the peak of D-line showed strong intensity. At 1500° C., the carbide showed a carbon structure characteristic similar to the crystal structure of multi-wall carbon nanotubes containing a disordered crystal, and thus it was considered that the surface of the heat-treated cellulose fiber was partially graphitized.

Example 4

FIG. 10 shows the results of energy dispersive X-ray (EDX) analysis of the inventive microtubular honeycomb carbon material coated with a rhodium catalyst. To coat a catalyst on the microtubular honeycomb carbon material, a catalyst solution 8 containing rhodium chloride hydrate dissolved in distilled water at a concentration of 0.05 mol % was prepared. The method for coating the catalyst was carried out in the same manner as suggested in FIG. 3. Vacuum pressure applied to coat the catalyst was 1 mbar, and the catalyst coating was performed by coating the catalyst at this pressure and room temperature for 10 seconds, drying the coated material under the same conditions for 10 seconds, and repeating the coating and drying processes more than 10 times. After completion of the coating process, the resulting material was placed in a reducing furnace, in which it was reduced at 500° C. in a hydrogen atmosphere for about 1 hour.

The figure inserted in the graphic diagram of FIG. 8 shows an SEM image of the microtubular honeycomb carbon material 11 after coating it with the catalyst. It can be seen that a thin rhodium catalyst layer was formed on the microtubular structure. These results were confirmed from EDX results.

Example 5

FIG. 11 is a general view of the microtubular reactor module 1 fabricated using the microtubular honeycomb carbon material 11 according to the present invention. The reactor frame 15 used herein was made of an SUS material and had an outer diameter of 1.5 mm, an inner diameter of 900 μm and a length of 2 mm.

The centrally placed microtubular honeycomb carbon material 11 was made of the heat-treated *Setaria viridis* sample obtained in Example 2. The microtubular honeycomb carbon material 11 made of the heat-treated *Setaria viridis* had a diameter of 600 μm and a length of 2 mm. The gap between the microtubular honeycomb carbon material 11 and the SUS reactor frame was sealed with a ceramic adhesive for high-temperature use at 1300° C. Sealing with the adhesive was carried out as shown in FIG. 5, and after application, the adhesive was dried at 100° C. for 24 hours.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for producing a microtubular reactor module for use in microcatalytic reactor systems, the method comprising;

preparing a metal catalyst solution having a nano-sized metal catalyst dispersed therein;

coating the metal catalyst solution on a surface of a microtubular honeycomb carbon material obtained from cellulose microfiber only and having a honeycomb structure in a sectional view thereof, the surface being in contact with fluid flow;

drying the coated microtubular honeycomb carbon material, and then reducing the nano-sized metal catalyst-coated surface of the carbon material in a reducing atmosphere; and assembling and sealing a reactor frame around each of the reduced microtubular honeycomb carbon materials using an adhesive, wherein the microtubular honeycomb carbon material has a diameter ranging from 200 to 600 μm, and wherein the coating includes at least:

placing the catalyst dispersion in a first micro-pipette to form a drop, and locating the micro-pipette at one side; and placing the above-produced microtubular honeycomb carbon material in a second micro-pipette, and sealing the gap between the second micro-pipette and the microtubular honeycomb carbon material with an optical adhesive.

2. The method of claim 1, wherein the preparing of the metal catalyst solution having the nano-sized metal catalyst dispersed therein is performed by dispersing in distilled water any one or more selected from the group consisting of nickel, platinum, palladium and rhodium, at a concentration of 0.1-1 mol %.

3. A method for producing a microtubular reactor module for use in microcatalytic reactor systems, the method comprising:

preparing a metal catalyst solution having a nano-sized metal catalyst dispersed therein;

coating the metal catalyst solution on the surface of a microtubular honeycomb carbon material from cellulose microfiber, the surface being in contact with fluid flow;

drying the coated microtubular honeycomb carbon material, and then reducing the nano-sized metal catalyst-coated surface of the carbon material in a reducing atmosphere; and assembling and sealing a reactor frame around the reduced microtubular honeycomb carbon material using an adhesive, wherein the coating of the metal catalyst solution on the surface of the microtubular honeycomb carbon material is performed by:

placing the catalyst dispersion in a first micro-pipette to form a drop, and locating the micro-pipette at one side;

placing the above-produced microtubular honeycomb carbon material in a second micro-pipette, sealing the gap between the second micro-pipette and the microtubular honeycomb carbon material with an optical adhesive, and locating the second micro-pipette at another side; and forming a pressure gradient between both ends of the microtubular honeycomb carbon material using capillary force of the microtubular honeycomb carbon material and a vacuum pump so as to suck minutely the catalyst solution drop formed in the first micro-pipette and to coat the catalyst on the surface of the microtubules fixed in the second micro-pipette, and repeating this pressure gradient-forming process to coat the catalyst the surface of the microtubules.

4. The method of claim 1, wherein the reactor frame is made of stainless steel (SUS) or ceramic material, and wherein the assembling and sealing of the reactor frame around the reduced microtubular honeycomb carbon material using the adhesive is performed by:

placing the reduced microtubular honeycomb carbon material in a half reactor frame filled with a ceramic adhesive;

covering the resulting microtubular honeycomb carbon material with another half reactor frame filled with a ceramic adhesive, and drying the resulting microtubular reactor module at 100-150° C. for more than 24 hours; and sealing all the gaps in the dried microtubular reactor module by laser welding if the reactor frame is made of the stainless steel, or sealing the gaps with a high-temperature ceramic adhesive if the reactor frame is made of the ceramic material.

5. The method of claim 1, wherein the sealing of the reactor module is performed using an epoxy-based adhesive at a temperature lower than 300° C. or a ceramic adhesive at a temperature of 300° C. or higher.

6. A method for producing a microtubular reactor module for use in microcatalytic reactor systems, the method comprising:

preparing a metal catalyst solution having a nano-sized metal catalyst dispersed therein;

coating the metal catalyst solution on a surface of a microtubular honeycomb carbon material obtained from cellulose microfiber only and having a honeycomb structure in a sectional view thereof the surface being in contact with fluid flow;

drying the coated microtubular honeycomb carbon material, and, then reducing the nano-sized metal catalyst-coated surface of the carbon material in a reducing atmosphere; and assembling and sealing a reactor frame around each of the reduced microtubular honeycomb carbon materials using an adhesive, wherein the microtubular honeycomb carbon material is produced by:

wetting and washing cellulose microfiber with distilled water and drying the washed cellulose microfiber at room temperature;

placing the dried cellulose microfiber in a reactor system for high-temperature heat treatment and removing oxygen remaining in the reactor system by means of a vacuum pump; and heat-treating the cellulose microfiber in the reactor system in an atmosphere of reducing gas such as hydrogen while controlling the temperature of the reactor system in a range of 500-1500° C.; and wherein the coating includes at least:

placing the catalyst dispersion in a first micro-pipette to form a drop, and locating the micro-pipette at one side; and placing the above-produced microtubular honeycomb carbon material in a second micro-pipette, and sealing the gap between the second micro-pipette and the microtubular honeycomb carbon material with an optical adhesive.

* * * * *